US009351072B2

(12) United States Patent
Siegel et al.

(10) Patent No.: US 9,351,072 B2
(45) Date of Patent: May 24, 2016

(54) MULTI-BAND HARMONIC DISCRIMINATION FOR FEEDBACK SUPPRESSION

(71) Applicant: Bose Corporation, Framingham, MA (US)

(72) Inventors: Michael Arthur Siegel, Somerville, MA (US); Christopher J. Perkins, Shrewsbury, MA (US); Alexander Michael George, Tolland, CT (US)

(73) Assignee: Bose Corporation, Framingham, MA (US)

( * ) Notice: Subject to any disclaimer, the term of this patent is extended or adjusted under 35 U.S.C. 154(b) by 261 days.

(21) Appl. No.: 14/071,806

(22) Filed: Nov. 5, 2013

(65) Prior Publication Data

US 2015/0124998 A1 May 7, 2015

(51) Int. Cl.
*H04B 15/00* (2006.01)
*H04R 3/02* (2006.01)
*H04R 27/00* (2006.01)

(52) U.S. Cl.
CPC *H04R 3/02* (2013.01); *H04R 27/00* (2013.01); *H04R 2430/03* (2013.01)

(58) Field of Classification Search
CPC ........ H04R 3/02; H04R 25/453; H04R 27/00; H04M 9/082; G10L 2021/02082
USPC .......................................................... 381/93
See application file for complete search history.

(56) References Cited

U.S. PATENT DOCUMENTS 5,103,234 A * 4/1992 Watkins ................. G01V 15/00 340/572.7
5,245,665 A * 9/1993 Lewis ...................... H04R 3/02 381/93
5,442,712 A 8/1995 Kawamura et al.
5,808,225 A * 9/1998 Corwin .................. G10H 3/125 84/602
6,066,790 A * 5/2000 Freeland .................. G10G 7/02 84/453

(Continued)

OTHER PUBLICATIONS

International Search Report & Written Opinion in international patent application No. PCT/US14/60466, mailed on Jan. 16, 2015; 8 pages.

(Continued)

*Primary Examiner* — Simon Sing
(74) *Attorney, Agent, or Firm* — Schmeiser, Olsen & Watts LLP

(57) ABSTRACT

A method and audio signal processor for detecting feedback in an electrical amplification system divides a frequency spectrum into a plurality of frequency bands, classifies a tone present in an incoming audio signal into one of the plurality of frequency bands based on a frequency of the tone, selects a threshold value based on the frequency band into which the tone is classified, and disqualifies the tone from potentially being feedback if an amplitude of the tone is greater than an amplitude of a harmonic of the tone by less than the threshold value. The tone is deemed to be potentially feedback if the amplitude of the tone is greater than an amplitude of a plurality of harmonics of the tone by at least the threshold value.

37 Claims, 4 Drawing Sheets

(56) References Cited

U.S. PATENT DOCUMENTS

| | | | | |
|---|---|---|---|---|
| 6,674,863 | B2 | 1/2004 | Ura | |
| 7,003,120 | B1 * | 2/2006 | Smith | G10H 1/20 381/103 |
| 8,259,974 | B2 | 9/2012 | Petrausch | |
| 2003/0138117 | A1 * | 7/2003 | Goff | H03G 5/165 381/103 |
| 2004/0179387 | A1 | 9/2004 | Abraham | |
| 2004/0240690 | A1 * | 12/2004 | Blamey | H04R 25/453 381/312 |
| 2006/0215852 | A1 | 9/2006 | Troxel | |
| 2006/0222188 | A1 * | 10/2006 | Asakawa | H04R 3/02 381/94.1 |
| 2009/0034768 | A1 * | 2/2009 | Lunner | H04R 25/453 381/318 |
| 2011/0176685 | A1 * | 7/2011 | Elmedyb | H04M 1/20 381/23.1 |
| 2012/0057720 | A1 * | 3/2012 | Van Leest | G10K 11/1782 381/71.11 |
| 2013/0104726 | A1 * | 5/2013 | Fukuda | G10H 1/0091 84/622 |

OTHER PUBLICATIONS

Van Waterschoot, Toon & Marc Moonen, "Comparative Evaluation of Howling Detection Driteria in Notch-Filter-Based Howling Suppression", Journal of Audio Engineering Society, Nov. 2010, vol. 58, No. 11, 19 pages.

National Instruments, "The Fundamentals of FFT-Based Signal Analysis and Measurement in LabVIEW and LabWindows/CVI", www.NI.com, Jun. 8, 2009, accessed on Oct. 23, 2013; 17 pages.

Bose Corporation, "ControlSpace(TM) ESP-88 System Quick Start Guide", Framingham, MA, accessed Oct. 24, 2013; 11 pages.

Bose Corporation, "ControlSpace(Tm) ESP-88 Engineered Sound Processor", pro.bose,com, accessed Oct. 24, 2013; 4 pages.

* cited by examiner

MULTI-BAND HARMONIC DISCRIMINATION FOR FEEDBACK SUPPRESSION

BACKGROUND

This specification relates generally to electronic amplification systems, and, more specifically, to feedback detection and suppression in the electronic amplification systems.

SUMMARY

All examples and features mentioned below can be combined in any technically possible way.

In one aspect, a method for detecting feedback in an electrical amplification system is provided. The method comprises dividing a frequency spectrum into a plurality of frequency bands, classifying a tone present in an incoming audio signal into one of the plurality of frequency bands based on a frequency of the tone, selecting a threshold value based on the frequency band into which the tone is classified, and disqualifying the tone from potentially being feedback if the amplitude of the tone is greater than the amplitude of a harmonic of the tone by less than the threshold value.

Embodiments of the method may include one of the following features, or any combination thereof.

The method can further comprise determining that the tone is potentially feedback if the amplitude of the tone is greater than the amplitude of a plurality of harmonics of the tone by at least the threshold value. A number of determinations of the tone as potential feedback can be required to reach a pre-established count before declaring the tone to be feedback. This pre-established count can be determined by the frequency band into which the tone is classified.

Additionally, the method can further comprise attenuating the amplitude of the tone after the tone is declared to be feedback by applying a filter with a predetermined initial gain, a predetermined width, or a combination thereof, determined by the frequency band into which the tone is classified.

As another example, the method can further comprise determining, in response to declaring the tone as feedback, whether a filter is available to operate on the tone, determining that all filters are currently being used with other tones, identifying a least important filter of the filters, and making the least important filter available for operating on the feedback tone. The least important filter can have a smallest amplitude of all the filters. The identifying of a least important filter can exempt a predetermined number of recently applied filters.

In other examples, the method can determine, in response to declaring the tone to be feedback, that a filter is already in use on the tone, and modifying a gain of the filter to increase a degree of attenuation attained by the filter on the amplitude of the tone. The amount by which to modify the gain of the filter can be based on the frequency band into which the tone is classified.

The plurality of harmonics of the tone can include a first harmonic of the tone and a second harmonic of the tone, or a sub-harmonic of the tone. The frequency spectrum can be divided into at least two non-overlapping frequency bands including a low band at a low frequency end of the frequency spectrum and a high band at a high frequency end of the frequency spectrum. Each frequency band can be associated with a different threshold value.

In one example, the method further comprises associating a plurality of threshold values with at least one of the frequency bands; wherein the selecting of a threshold value based on the frequency band into which the tone is classified includes further selecting one of the plurality of threshold values based on a harmonic with which the amplitude of the tone is to be compared. Each threshold value may be user-adjustable.

In another aspect, an audio signal processor comprises a processor configured to divide the frequency spectrum into a plurality of frequency bands, classify a tone present in the audio samples into one of the plurality of frequency bands based on a frequency of the tone, select a threshold value based on the frequency band into which the tone is classified, and disqualify the tone from potentially being feedback if the amplitude of the tone is greater than the amplitude of a harmonic of the tone by less than the threshold value.

Embodiments of the audio sound processor may include one of the following features, or any combination thereof.

The processor of the audio sound processor can be further configured to determine that the tone is potentially feedback if the amplitude of the tone is greater than the amplitude of a plurality of harmonics of the tone by at least the threshold value. A number of determinations of the tone as potential feedback can be required to reach a pre-established count before declaring the tone to be feedback. This pre-established count can be determined by the frequency band into which the tone is classified.

Additionally, the audio signal processor can further comprise a plurality of filters, wherein the processor can be further configured to attenuate the amplitude of the tone after the tone is declared to be feedback by applying one of the plurality of filters with a predetermined initial gain, a predetermined width, or a combination thereof determined by the frequency band into which the tone is classified.

In one example, the audio signal processor further comprises a plurality of filters, and the processor can be further configured to determine, in response to declaring the tone as feedback, whether one of the plurality of filters is available to operate on the tone, to determine that all filters are currently being used with other tones, to identify a least important filter of the plurality of filters, and to make the least important filter available for operating on the feedback tone. The least important filter can have a smallest amplitude of all the filters. The processor can exempt a predetermined number of recently applied filters when identifying the least important filter.

In other examples, the processor of the audio signal processor can be further configured to determine, in response to declaring the tone to be feedback, that a filter is already in use on the tone, and to modify a gain of the filter to increase a degree of attenuation attained by the filter on the amplitude of the tone. The amount by which to modify the gain of the filter can be based on the frequency band into which the tone is classified.

The plurality of harmonics of the tone can include a first harmonic of the tone and a second harmonic of the tone, or a sub-harmonic of the tone. The processor can further be configured to divide the frequency spectrum into at least two non-overlapping frequency bands including a low band at a low frequency end of the frequency spectrum and a high band at a high frequency end of the frequency spectrum. Each frequency band can be associated with a different threshold value. Each threshold value may be user-adjustable.

In another example, the processor can further be configured to associate a plurality of threshold values with at least one of the frequency bands, and select a threshold value based on the frequency band into which the tone is classified by selecting one of the plurality of threshold values associated with the at least one frequency band based on a harmonic with which the amplitude of the tone is to be compared.

The processor of the audio signal processor can further comprise memory storing program code for detecting and suppressing feedback in an audio signal and the processor can be configured to execute the program code stored in memory.

In still another aspect, an audio system comprises an acoustic transducer converting sound into electrical signals and an audio signal processor. The audio signal processor comprises an analog-to-digital converter that converts the electrical signals into digital audio samples, and a processor that transforms the digital audio samples into a frequency spectrum. The processor is configured to divide the frequency spectrum into a plurality of frequency bands, classify a tone present in the audio samples into one of the plurality of frequency bands based on a frequency of the tone, select a threshold value based on the frequency band into which the tone is classified, and disqualify the tone from potentially being feedback if the amplitude of the tone is greater than the amplitude of a harmonic of the tone by less than the threshold value.

Examples of the audio system may include one of the following features, or any combination thereof. The processor of the audio sound processor can further be configured to determine that the tone is potentially feedback if the amplitude of the tone is greater than the amplitude of a plurality of harmonics of the tone by at least the threshold value.

In another aspect, an audio signal processor comprises means for dividing a frequency spectrum into a plurality of frequency bands, means for classifying a tone present in an incoming audio signal into one of the plurality of frequency bands based on a frequency of the tone, means for selecting a threshold value based on the frequency band into which the tone is classified, and means for disqualifying the tone from potentially being feedback if the amplitude of the tone is greater than the amplitude of a harmonic of the tone by less than the threshold value. The frequency spectrum may be divided into at least two non-overlapping frequency bands including a low band at a low frequency end of the frequency spectrum and a high band at a high frequency end of the frequency spectrum.

Examples of the audio signal processor may include one of the following features, or any combination thereof. A plurality of threshold values can be associated with at least one of the frequency bands; and the means for selecting a threshold value based on the frequency band into which the tone is classified further includes means for selecting one of the plurality of threshold values based on a harmonic with which the amplitude of the tone is to be compared. Each threshold value can be user-adjustable.

The audio signal processor may include means for determining that the tone is potentially feedback if the amplitude of the tone is greater than the amplitude of a plurality of harmonics of the tone by at least the threshold value. The plurality of harmonics of the tone can include a first harmonic of the tone and a second harmonic, or a sub-harmonic, or a combination thereof, of the tone. Each frequency band can be associated with a different threshold value.

In addition, the audio signal processor may include means for requiring a number of determinations of the tone as potential feedback to reach a pre-established count before declaring the tone to be feedback. The pre-established count may be determined by the frequency band into which the tone is classified. Also, the audio signal processor may include means for attenuating the amplitude of the tone after the tone is declared to be feedback by applying a filter with a predetermined initial gain, a predetermined width, or a combination thereof, determined by the frequency band into which the tone is classified.

The audio signal processor may further comprise means for determining, in response to means for declaring the tone as feedback, whether a filter is available to operate on the tone; means for determining that all filters are currently being used with other tones; means for identifying a least important filter of the filters; and means for making the least important filter available for operating on the feedback tone. The least important filter can have a smallest magnitude of all the filters. The means for identifying a least important filter may exempt a predetermined number of recently applied filters.

The audio signal processor may further comprise means for determining, in response to means for declaring the tone to be feedback, that a filter is already in use on the tone; and means for modifying a gain of the filter to increase a degree of attenuation attained by the filter on the amplitude of the tone. The amount by which to modify the gain of the filter can be based on the frequency band into which the tone is classified.

BRIEF DESCRIPTION OF THE DRAWINGS

The above and further features and advantages may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Figure 1:
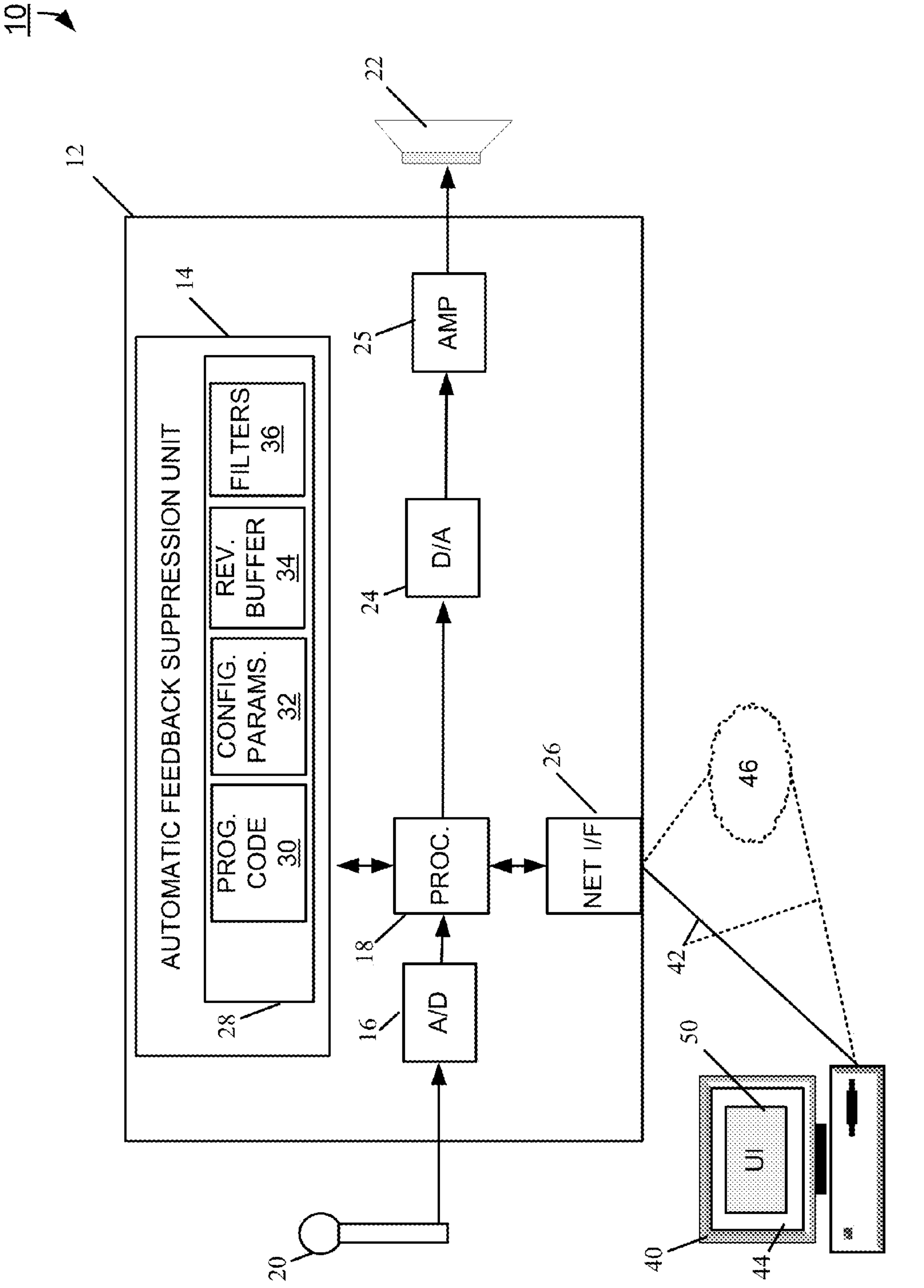
FIG. 1 is a block diagram of an example audio system including an audio signal processor with an automatic feedback suppression module configured to eliminate acoustic feedback in the PA system.

In brief overview, automatic feedback suppression units or devices eliminate acoustic feedback within audio systems, including public address (PA) systems, by identifying the existence of a feedback tone, and then using a filter to remove the tone. An important factor for discerning feedback from music lies in the respective harmonic characteristics of the two signals. Whereas musical tones are rich in harmonics, feedback tones are nearly harmonic-free. A conventional technique for deciding whether a relatively loud tone at a particular frequency, F, is feedback or a musical note is to compare the amplitude of that tone, Amplitude (F), with the amplitude of each of its first and second harmonics, Amplitude (2*F) and Amplitude (3*F).

A constant value, C, can be used to represent the necessary difference (in dB) between two compared amplitudes for a tone, F, to be declared feedback. As an example, consider the case where the constant C, is set equal to 30 dB, the tone in question, F, is equal to 1000 Hz, the amplitude of the tone, Amplitude (1000 Hz), is equal to 50 dB, and the amplitude of its first harmonic, Amplitude (2000 Hz), is equal to 25 dB. In this case, the tone is not deemed feedback because the difference between the two amplitudes (50 dB−25 dB=25 dB) is less than the value of the constant C, which is 30 dB; that is, the first harmonic of the tone is relatively powerful, being only 25 dB less than the amplitude of the fundamental tone.

If, instead, the amplitude of the first harmonic, Amplitude (2000 Hz), is equal to 7 dB, the difference between the fundamental tone and its first harmonic is equal to 43 db (50 dB−7 dB). In this instance, the tone may be a feedback tone because the difference in amplitudes exceeds the value of the constant C. The determination proceeds with a comparison of the amplitude, Amplitude (3000 Hz), of the second harmonic of the tone with the amplitude, Amplitude (1000 Hz) of the fundamental tone. If the difference between these two amplitudes also exceeds the value of the constant C, the tone (F=1000 Hz) is deemed feedback and is filtered. If the difference between the amplitudes is less than the value of the constant C, the tone is not considered feedback and is allowed to pass for amplification.

A challenge lies in choosing a proper value for the constant C for accurately and swiftly identifying feedback tones for elimination (i.e., use a lower value for C), while avoiding spuriously identifying a normal music tone, such as from an acoustic guitar, as feedback (i.e., use a higher value for C). If a feedback-elimination filter is improperly deployed on a musical tone, the quality of that musical tone deteriorates. Conversely, if feedback is not quickly eliminated, the feedback tone will quickly grow to an annoying and possibly dangerous volume.

Automatic feedback suppression units, as described herein, employ an approach that involves varying the value of the constant C based on the frequency band in which the tone in question, F, lies. The frequency spectrum of the PA system is divided into various bands, and the tone F is classified in one of the bands. For example, if F<500 Hz, the tone is classified LOW, if 500 Hz<F<2000 Hz, the tone is classified MID, and if 2000 Hz<F<2500 Hz, the tone is classified HIGH. The value of the constant C can vary based on the frequency band within which the tone F falls. For example, if the tone is classified LOW, C(LOW)=35 dB; if classified HIGH, C(HIGH)=15 dB. The value of the constant C can also vary based on the harmonic of the tone being used in the comparison. For example, if the tone is classified HIGH, the value of C for the first harmonic can be equal to 15 dB, and equal to 20 dB for the second harmonic. If instead the tone is classified LOW, the value of C for the first harmonic can be equal to 33 dB, and equal to 36 dB for the second harmonic. The frequency spectrum may be divided into any number of frequency bands, having different widths than those illustrated in the previous example, and the value of the constant C may vary for each of the frequency bands. For example, the previous HIGH band can instead range between 2000 Hz<F<22,000 Hz. As another example, there can be a fourth band, referred to as an ULTRA HIGH band, ranging between 2500 Hz<F<22,000 Hz. Alternatively, the HIGH band can be defined as F>2000 Hz, or the ULTRA HIGH band as F>2500 Hz, without any specification of an upper limit.

Whereas feedback occurs similarly across the entire audio band, from low to high frequencies, music exists much more prominently in the lower part of the spectrum, below approximately 4 kHz. Below this frequency is where most fundamentals of musical signals exist. Above this frequency, mostly only harmonics of tones are found, with the exception of a few instruments and noises. By allowing the value of constant C to vary based on the frequency of a possible feedback tone, a conservative approach to declaring a tone to be feedback (higher value for C) can be applied at the lower end of the frequency spectrum, thereby reducing possible false detections, and an aggressive approach (lower value for C) can be applied at higher frequencies, where little musical content generally lies. This customizing of the value of the constant C for the particular end of the frequency spectrum enables quick detection and elimination of feedback at higher frequencies, while avoiding false feedback detection at lower frequency musical tones.

FIG. 1 shows a block diagram of an example audio system 10 including an audio signal processor 12 with an automatic feedback suppression module 14 configured to eliminate acoustic feedback in the PA system. The PA system 10 is deployed in an environmental setting, for example, a conference room, an auditorium, a classroom, a house of worship, or a stage. The audio signal processor 12 can be embodied as a ControlSpace™ ESP-88 Engineered Sound Processor, produced by Bose of Framingham, Mass., configured with the automatic feedback suppression module 14.

The audio signal processor 12 further includes an analog-to-digital (A/D) converter 16, a processor 18, a plurality of analog inputs (not shown) for connecting to audio signal sources, such as a microphone 20, a plurality of analog outputs (not shown) for connecting to sound-emitting devices, such as a speaker 22, a digital-to-analog (D/A) converter 24, an amplifier 25, and a network interface (I/F) 26 for establishing communications with external devices, such as a computing system. The microphone 20 is in vicinity of the speaker 22, where the microphone may pick up sound emitted by the speaker, potentially leading to unwanted feedback tones.

The automatic feedback suppression module 14 may include memory 28 that stores program code 30, which, when executed by the processor 18, detects and suppresses feedback tones in the sound coming from the microphone 20. During its execution, the program code 30 refers to other portions of the memory 28 that store configuration parameters 32, implement a revolving buffer 34, and apply filters 36 to detected feedback tones. A portion of the program code 26, when executed, produces a graphical user interface on the display screen of an external device by which a user can configure one or more of the configuration parameters 32.

These configuration parameters 32 include: settings tuned for the environment within which the PA system 10 is deployed, including predetermined definitions of the frequency bands (i.e., divisions of the frequency spectrum); one or more constant C values for each frequency band used to detect feedback; a threshold count (P) for each frequency band representing the number of detections as potential feedback required of a tone for that tone to be declared feedback; initial gain (G), delta (D) gain, and width (W) settings for the filters 36 for each frequency band; and the number (N) of recently applied filters exempted from a least-important-filter analysis (also frequency band dependent) performed in the event a busy dynamic filter needs to be released in order to be applied to a recently detected feedback tone. The filters 36 being applied to suppress feedback tones can be dynamic notch filters, meaning such filters are recyclable or reusable for different feedback tones if needed, or static notch filters, meaning such filters, once used for a tone, remain used for that tone (until a user resets the system). In addition, the filters 36 can be instantiated using software, hardware, or a combination thereof. The width (W) of a given filter 36 instantiated on the feedback tone may vary with the frequency band 102 into which the feedback tone is classified.

The A/D converter 16 is in communication with the microphone 20 (i.e., an acoustic transducer), from which the A/D converter 16 receives electrical signals corresponding to the sound picked up by the microphone 20, and produces digital signals therefrom. The processor 18 is a digital signal processor (DSP) in communication with the A/D converter 16 to receive and process the digital signals using a Fast Fourier Transform (FFT) function. The DSP 18 is in communication with the automatic feedback suppression module 14 to perform suppression of any feedback detected in the processed digital signals. Released or unfiltered tones pass to the D/A converter 24, which converts the digital signals to their analog signal counterparts. The amplifier 25 amplifies these analog signals and drives the speaker 22 to produce corresponding sound.

A computing system 40 may be in communication with the audio signal processor 12 over a communication link 42. The computing system 40 includes a display screen 44 and a processor (not shown) in communication with memory (not shown) over a signal bus (not shown). A user of the computing system 40 can enter information and commands through a user-input interface 50 with one or more user-input devices, e.g., a keyboard, a mouse, trackball, touch-pad, touch-screen, microphone, joystick. Exemplary implementations of the computing system 40 include, but are not limited to, personal computers (PC), Macintosh computers, workstations, laptop computers, kiosks, hand-held devices, such as personal digital assistants (PDAs), smartphones, Apple iPads™, Amazon.com KINDLEs®, navigation and global positioning systems, and network terminals.

The communication link 42 can be a direct connection (wireless or wired) to the audio signal processor 12 or one or more communication paths through a network 46 (shown in dashed outline to signify an alternative connection path). Examples of the network 46 include, but are not limited to, local-area networks (LAN), metro-area networks (MAN), and wide-area networks (WAN), such as the Internet or World Wide Web. The computing system 40 can connect to the audio signal processor 12 through one or more of a variety of connection types and associated protocols, such as standard telephone lines, digital subscriber lines (DSL), asynchronous DSL, LAN or WAN links (e.g., T1, T3), broadband connections (Frame Relay, ATM), RS-232C, RS-485, and wireless connections (e.g., 802.11(a), 802.11(b), 802.11(g)).

Figure 2:
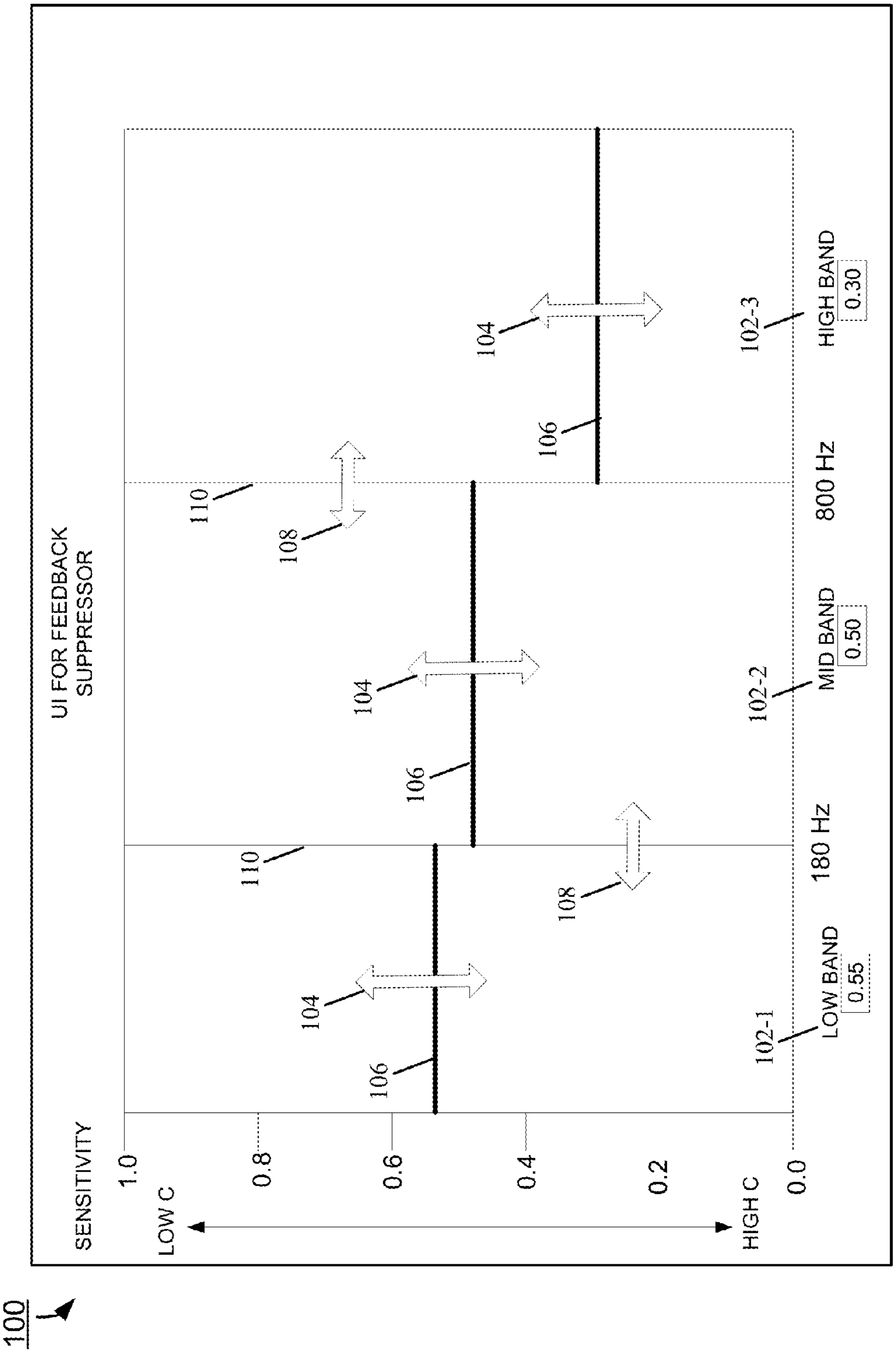
FIG. 2 is an example graphical user interface that may appear on the display screen of a computing system through which a user may configure the automatic feedback suppression module.

FIG. 2 shows an example graphical user interface 100 that can appear on the display screen 44 of the computing system 40 to facilitate configuration of one or more configuration parameters 32 of the automatic feedback suppression module 14. The x-axis of the user interface 100 corresponds to frequency; the y-axis corresponds to the sensitivity settings used for feedback detection. The x-axis spans the expected range of the frequency spectrum of incoming audio signals for a given environmental setting; the individual frequency bands are delineated across the x-axis. The y-axis spans the range of sensitivity settings, normalized over values 0.0 to 1.0. High sensitivity settings appear at the upper end of the y-axis; low sensitivity settings appear at the lower end of the y-axis. Low sensitivity settings (e.g., 0.3) produce high values for the constant C, which correspond to a lower chance of detecting feedback. High sensitivity settings (e.g., 0.8) produce low values for the constant C, which corresponds to an aggressive approach to detecting feedback, which can result in fast feedback elimination, but also increase the chance of false detection. Through the user interface 100 displayed on the computing system 40, a user can adjust the performance of the automatic feedback suppression module 14 by adjusting the sensitivity for detecting feedback for each individual frequency band.

In this example, the frequency spectrum is divided into three frequency bands 102-1, 102-2, and 102-3 (generally, 102). Frequency band 102-1 is referred to as the LOW band, frequency band 102-2 as the MID band, and frequency band 102-3 as the HIGH band. Other examples can have as few as two or greater than three frequency bands without departing from the principles described herein.

The user can use a pointing device (e.g., mouse) to move the horizontal lines 106 up or down (as indicated by double-headed arrows 104) in order to increase or decrease the sensitivity (i.e., value of C) for detecting feedback for a given frequency band 102. A setting of 0.5 in all frequency bands 102 may result in a different C value (in dB) for each frequency band. Increasing the sensitivity from 0.5 to 0.6 in each frequency band 102 operates to reduce the C value (in dB) in that band.

For illustration purposes, the frequency range for the LOW band 102-1 extends up to and includes 180 Hz, for the MID-band 102-2, the frequency range spans between 180 Hz to 800 Hz, and for the HIGH band 102-3, the frequency range covers 800 Hz and above. The definition of the particular frequency ranges 102 can depend upon the environmental setting of the PA system 10 selected by a user, such as a "conference room setting" or a "stage setup setting." In one example, the user can move the vertical boundary lines 110 left or right (as indicated by double-headed arrows 108), thereby increasing or decreasing the size (i.e., range) of a given frequency band.

In other examples, each frequency band 102 can have multiple constant C value settings, one for each harmonic or sub-harmonic of the tone in question, each C value setting being represented by a different horizontal line 106 within that frequency band 102.

In the example shown, the LOW band 102-1 has a sensitivity value of 0.55, which can correspond to a C value of 33 dB, the MID band 102-2 has a sensitivity value of 0.50, which can correspond to a C value of 35 dB, and the HIGH band 102-3 has a sensitivity value of 0.30, which can correspond to a C value of 36 dB. Accordingly, this example configuration of the automatic feedback suppression module 14 more aggressively declares feedback for tones classified in the LOW band 102-1 than for tones classified in the MID band 102-2, and more aggressively for tones classified in the MID band 102-2 than for tones classified in the HIGH band 102-3.

Figure 3A:
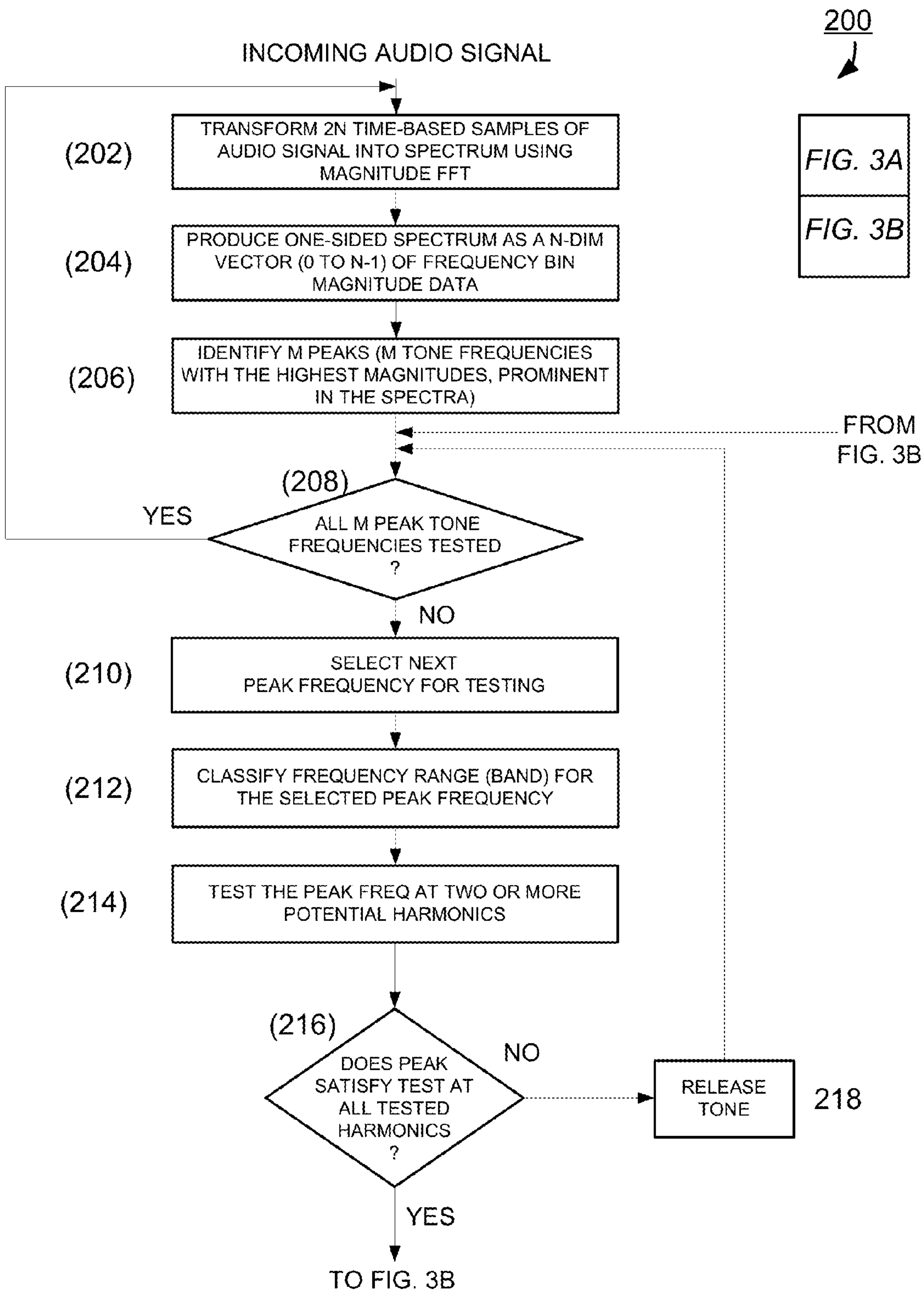
FIG. 3A and FIG. 3B are flow diagrams of an example process for suppressing feedback in an audio system.
Figure 3B:
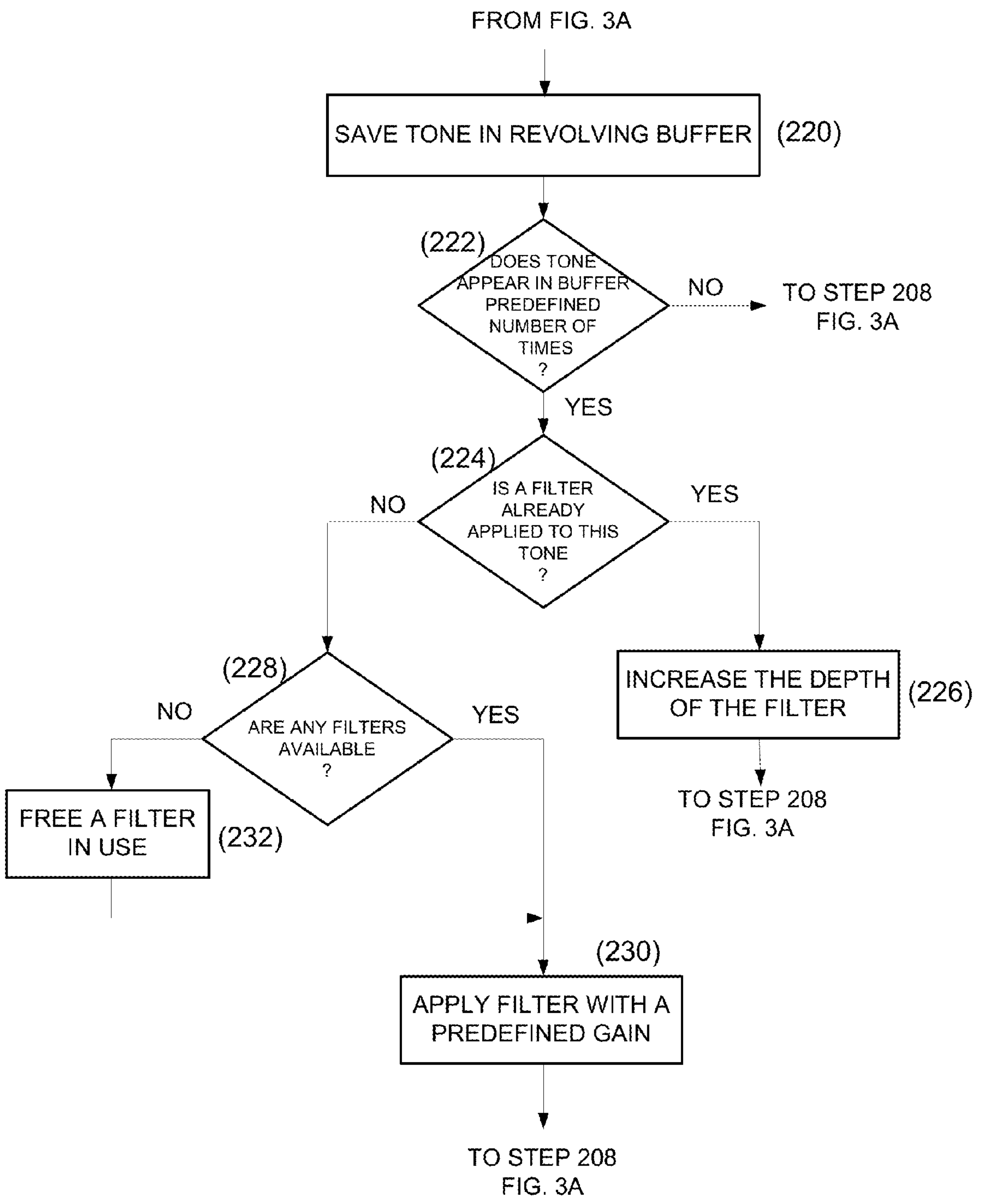

FIG. 3A and FIG. 3B together show an example process 200 for suppressing feedback in an audio system, such as a public address system. In the description of the process 200, reference is made to elements in FIG. 1 and FIG. 2 to facilitate an understanding of the process. In FIG. 3A, the process 200 begins with the processor 18 receiving and processing (step 202) 2*N time-based samples (e.g., 256 samples, where N=128) using a Fast Fourier Transform (FFT) algorithm. The FFT algorithm transforms the time-based samples into a two-sided spectrum in the frequency domain. Because the audio signal is a real world signal, the negative frequency information of the frequency spectrum is redundant, and the FFT function can convert (step 204) the two-sided spectrum into a one-sided spectrum, and produce an N-dimensional vector of frequency bin magnitude data. Each of the N bins of the vector corresponds to a particular frequency in the frequency spectrum and holds a value corresponding to the magnitude (in dB) for that frequency.

A spectral peak detector (part of the program code 30) scans the vector and identifies (step 206) M frequencies or tones with the highest magnitudes in the spectrum. The value assigned M (e.g., 3) corresponds to the total number of feedback tones tested for by the automatic feedback suppression module 14 during a given cycle. The spectral peak detector can produce an M-dimensional vector of frequency bins containing magnitude data. Each of the M bins of this vector corresponds to one of the M frequencies in the frequency spectrum and holds a value corresponding to the magnitude (in dB) for that frequency. Each of these M peak frequencies is tested to determine whether that frequency corresponds to feedback that should be suppressed, as described herein.

At step 208, the automatic feedback suppression module 14 determines whether all M peak frequencies in the M-dimensional vector have been tested. If so, the process 200 returns for the next cycle of 2*N time-based samples to be transformed into a new one-sided vector containing magnitude data at N frequencies in the frequency spectrum of the audio signal.

If, instead, not all M peak frequencies have yet been tested, the next untested frequency bin in the M-dimensional vector is selected (step 210). The frequency band is classified (step 212) for this selected frequency. For example, referring to the multiple frequency bands 102 described in connection with FIG. 2, a peak frequency of 59 Hz would fall within the LOW band 102-1. If, instead, the selected frequency bin corresponds to a peak frequency of 1 kHz, this peak frequency would be classified has high, because it is greater than 800 Hz, and, thus, falls within the HIGH band 102-3.

The particular band in which the frequency-under-test is classified determines the value of the constant C, used to test (step 214) the frequency at multiple different potential harmonics. For example, consider that the frequency-under-test falls within the LOW band 102-1 and the value of the constant C assigned to this frequency band is equal to 33 dB, the peak magnitude at this frequency must be 33 dB higher in magnitude than the magnitudes at its potential harmonics at 2*F and 3*F. The magnitudes at the potential harmonics at 2*F and 3*F are acquired as part of the FFT results (step 202). Other examples test at these and other potential harmonics and sub-harmonics, such as 0.5*F and ⅔*F, or any combination thereof. In still other examples, the value of the constant C can vary based on the particular harmonic being tested (e.g., 33 dB for the first harmonic, 36 dB for the second harmonic). To be considered a candidate for being declared feedback, the tone at frequency F must satisfy all tests at all tested harmonics. In other examples, to be considered a candidate for being declared feedback, the tone at frequency F may satisfy all tests at a subset of the tested harmonics.

If, at step 216, the frequency-under-test (F) does not satisfy the criterion at all of the tested harmonics (or at a subset of the tested harmonics), this tone is disqualified from further consideration as feedback. The tone is "released" (step 218), that is, allowed to pass unfiltered, and removed from memory 28. Alternatively, if the tone satisfies all tests at all (or a subset of) the tested harmonics (i.e., the amplitude of the tone F exceeds the amplitude at the tested harmonics by the appropriate threshold value), the tone could potentially be feedback.

FIG. 3B shows the process 200 after the tone F is provisionally identified as feedback. At step 220, the tone is stored in a revolving buffer 34. The revolving buffer 34 is referred to as revolving in that the buffer stores a fixed number of tones in FIFO (First-in First-out) fashion, which serves as a history of the most recent tones to be provisionally identified as feedback. When the buffer is full, and a subsequent candidate tone becomes provisionally identified as feedback, the oldest (or first-in) tone is removed from the head of the buffer to make room at the tail of the buffer for the candidate tone.

At step 222, the buffer 34 is scanned to count the number of times the candidate tone F appears within the buffer 34. This count is compared with a predefined threshold (P), which represents the number of times a candidate tone must appear within the recorded history in the buffer 34 in order for the candidate tone to qualify as feedback. If the count equals the predefined threshold (P), then the tone F is deemed feedback; otherwise the process 200 returns to step 208 (FIG. 3A) to test the next peak tone, if any, selected for testing during this current cycle.

The predefined threshold can vary depending on the classification of the tone. For example, the predefined threshold can be set equal to three for a tone classified as MID band 102-2 and equal to one for a tone classified as HIGH band 102-3. According to these example settings, a HIGH band tone is considered feedback just upon a single occurrence; whereas a tone classified in the MID band 102-2 must occur three times before being considered feedback.

In response to a candidate tone being declared feedback, the process 200 determines (step 224) whether the tone already has a filter 32 operating upon it. If so, this re-detection of the feedback tone signifies that the currently applied filter 32 is insufficient to suppress this feedback tone. To improve the effectiveness of the filter 32, the depth of this filter (step 226) is increased by a predetermined amount (e.g., −3 dB). As an example illustrating this step of the process, consider that the filter is presently reducing the amplitude at the tone by −6 dB. The depth (D) of the filter can be increased by an additional −3 dB, to achieve an overall amplitude reduction of −9 dB. The amount by which to increase the depth (D) of the filter is predetermined, and is based on the frequency band classification of the candidate tone. For example, a feedback tone previously classified in the HIGH band 102-3 may have a greater increase in filter depth (D) than if classified in the MID band 102-2. The process 200 then returns to step 208 (FIG. 3A) to test the next peak tone, if any, selected for testing during this current cycle. In addition, the width of the filter applied can also be based on the frequency band classification of the feedback tone. For example, a relatively wide filter with a width corresponding to an eighth of an octave may be applied on feedback tones classified in the LOW band 102-1, whereas a relatively narrow filter with a width of 1/25th of an octave may be applied on feedback tones classified in the HIGH band 102-3.

If instead, at step 224, the feedback tone does not already have a filter, the process 200 applies one. At step 228, a check occurs to determine whether a filter 32 is available. If a filter is available, the filter is applied (step 230) to the feedback tone with an initial gain (G). If, instead, all filters are currently in use, and none is available for the feedback tone, one of the filters in use is freed (step 232) and applied (step 230) to the feedback tone. To determine which filter to make available for use with the feedback tone, one technique includes identifying the least important filter currently in use, for example, the notch filter with the smallest magnitude of all the filters. The amplitude of the filter generally reflects the degree of the feedback problem caused by the given feedback tone upon which that notch filter is operating; the smaller the amplitude of the applied filter, the lesser the problem posed by the associated feedback tone. This technique can exempt a predetermined number (N) of the most recent filters applied to feedback tones in order to avoid removing a filter from a tone recently detected.

After applying a filter to the feedback tone, the process 200 returns to step 208 (FIG. 3A) to test the next peak tone, if any, selected for testing during this current cycle.

Examples of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM.

Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method for detecting feedback in an electrical amplification system, the method comprising:

dividing a frequency spectrum into a plurality of frequency bands;

classifying, by a processor receiving an incoming audio signal, a tone present in the incoming audio signal into one of the frequency bands based on a frequency of the tone;

selecting a threshold value with the processor based on the frequency band into which the tone is classified, the threshold value being different from at least one other threshold value associated with another one of the frequency bands; and disqualifying the tone from potentially being feedback if an amplitude of the tone is determined by the processor to be greater than an amplitude of a harmonic of the tone by less than the threshold value.

2. The method of claim 1, further comprising determining, by the processor, that the tone is potentially feedback if the amplitude of the tone is greater than an amplitude of a plurality of harmonics of the tone by at least the threshold value.

3. The method of claim 2, further comprising requiring a number of determinations of the tone as potential feedback to reach a pre-established count before declaring the tone to be feedback.

4. The method of claim 3, wherein the pre-established count is determined by the frequency band into which the tone is classified.

5. The method of claim 2, further comprising attenuating the amplitude of the tone after the tone is declared to be feedback by applying a filter with a predetermined initial gain determined by the frequency band into which the tone is classified.

6. The method of claim 2, further comprising attenuating the amplitude of the tone after the tone is declared to be feedback by applying a filter with a predetermined width determined by the frequency band into which the tone is classified.

7. The method of claim 2, further comprising:

determining, after the tone is declared to be feedback, whether a filter is available to operate on the tone;

determining that all filters are currently being used with other tones;

identifying a least important filter of the filters; and making the least important filter available for operating on the feedback tone.

8. The method of claim 7, wherein the least important filter has a smallest magnitude of all the filters.

9. The method of claim 7, wherein the identifying of a least important filter exempts a predetermined number of recently applied filters.

10. The method of claim 2, further comprising:

determining, after the tone is declared to be feedback, that a filter is already in use on the tone; and modifying a gain of the filter to increase a degree of attenuation attained by the filter on the amplitude of the tone.

11. The method of claim 10, wherein an amount by which to modify the gain of the filter is based on the frequency band into which the tone is classified.

12. The method of claim 2, wherein the plurality of harmonics of the tone includes a first harmonic of the tone and a second harmonic of the tone.

13. The method of claim 2, wherein the plurality of harmonics of the tone includes a sub-harmonic of the tone.

14. The method of claim 1, wherein the frequency spectrum is divided into at least two non-overlapping frequency bands including a low band at a low frequency end of the frequency spectrum and a high band at a high frequency end of the frequency spectrum.

15. The method of claim 1, further comprising associating each frequency band with a different threshold value.

16. The method of claim 1, further comprising associating a plurality of threshold values with at least one of the frequency bands; and wherein selecting a threshold value with the processor based on the frequency band into which the tone is classified includes further selecting one of the plurality of threshold values based on a harmonic with which the amplitude of the tone is to be compared.

17. The method of claim 1, wherein the threshold value is user-adjustable.

18. An audio signal processor, comprising:

a processor receiving digitized audio samples and transforming the audio samples into a frequency spectrum, the processor configured to divide the frequency spectrum into a plurality of frequency bands, classify a tone present in the audio samples into one of the frequency bands based on a frequency of the tone, select a threshold value based on the frequency band into which the tone is classified, the threshold value being different from at least one other threshold value associated with another one of the frequency bands and disqualify the tone from potentially being feedback if an amplitude of the tone is greater than an amplitude of a harmonic of the tone by less than the threshold value.

19. The audio signal processor of claim 18, wherein the processor is further configured to determine that the tone is potentially feedback if the amplitude of the tone is greater than an amplitude of a plurality of harmonics of the tone by at least the threshold value.

20. The audio signal processor of claim 19, wherein the processor is further configured to require a number of determinations of the tone as potential feedback to reach a pre-established count before declaring the tone to be feedback.

21. The audio signal processor of claim 20, wherein the pre-established count is determined by the frequency band into which the tone is classified.

22. The audio signal processor of claim 19, further comprising a plurality of filters, and wherein the processor is further configured to attenuate the amplitude of the tone after the tone is declared to be feedback by applying one of the filters with a predetermined initial gain determined by the frequency band into which the tone is classified.

23. The audio signal processor of claim 19, further comprising a plurality of filters, and wherein the processor is further configured to attenuate the amplitude of the tone after the tone is declared to be feedback by applying one of the filters with a predetermined width determined by the frequency band into which the tone is classified.

24. The audio signal processor of claim 19, further comprising a plurality of filters, and wherein the processor is further configured to determine, after the tone is declared to be feedback, whether one of the filters is available to operate on the tone, to determine that all filters are currently being used with other tones, to identify a least important filter of the plurality of filters, and to make the least important filter available for operating on the feedback tone.

25. The audio signal processor of claim 24, wherein the least important filter has a smallest magnitude of all of the filters.

26. The audio signal processor of claim 24, wherein the processor is further configured to exempt a predetermined number of recently applied filters when identifying the least important filter.

27. The audio signal processor of claim 19, wherein the processor is further configured to:

determine, after the tone is declared to be feedback, that a filter is already in use on the tone; and modify a gain of the filter to increase a degree of attenuation attained by the filter on the amplitude of the tone.

28. The audio signal processor of claim 27, wherein an amount by which to modify the gain of the filter is based on the frequency band into which the tone is classified.

29. The audio signal processor of claim 19, wherein the plurality of harmonics of the tone includes a first harmonic of the tone and a second harmonic of the tone.

30. The audio signal processor of claim 19, wherein the plurality of harmonics of the tone includes a sub-harmonic of the tone.

31. The audio signal processor of claim 18, wherein the processor is further configured to divide the frequency spectrum into at least two non-overlapping frequency bands including a low band at a low frequency end of the frequency spectrum and a high band at a high frequency end of the frequency spectrum.

32. The audio signal processor of claim 18, wherein the processor is further configured to associate each frequency band with a different threshold value.

33. The audio signal processor of claim 18, wherein the processor is further configured to associate a plurality of threshold values with at least one of the frequency bands; and wherein the processor selects a threshold value based on the frequency band into which the tone is classified by selecting one of the threshold values associated with the at least one frequency band based on a harmonic with which the amplitude of the tone is to be compared.

34. The audio signal processor of claim 18, further comprising memory storing program code for detecting and suppressing feedback in an audio signal and wherein the processor is configured to execute the program code stored in memory.

35. The audio signal processor of claim 18, wherein the threshold value is user-adjustable.

36. An audio system comprising:

an acoustic transducer converting sound into electrical signals;

an audio signal processor comprising:

an analog-to-digital converter converting the electrical signals into digital audio samples; and a processor transforming the digital audio samples into a frequency spectrum, the processor configured to divide the frequency spectrum into a plurality of frequency bands, classify a tone present in the audio samples into one of the frequency bands based on a frequency of the tone, select a threshold value based on the frequency band into which the tone is classified, the threshold value being different from at least one other threshold value associated with another one of the frequency bands, and disqualify the tone from potentially being feedback if an amplitude of the tone is greater than an amplitude of a harmonic of the tone by less than the threshold value.

37. The audio system of claim 36, wherein the processor is further configured to determine that the tone is potentially feedback if the amplitude of the tone is greater than an amplitude of a plurality of harmonics of the tone by at least the threshold value.

* * * * *